United States Patent Office 3,293,931
Patented Dec. 27, 1966

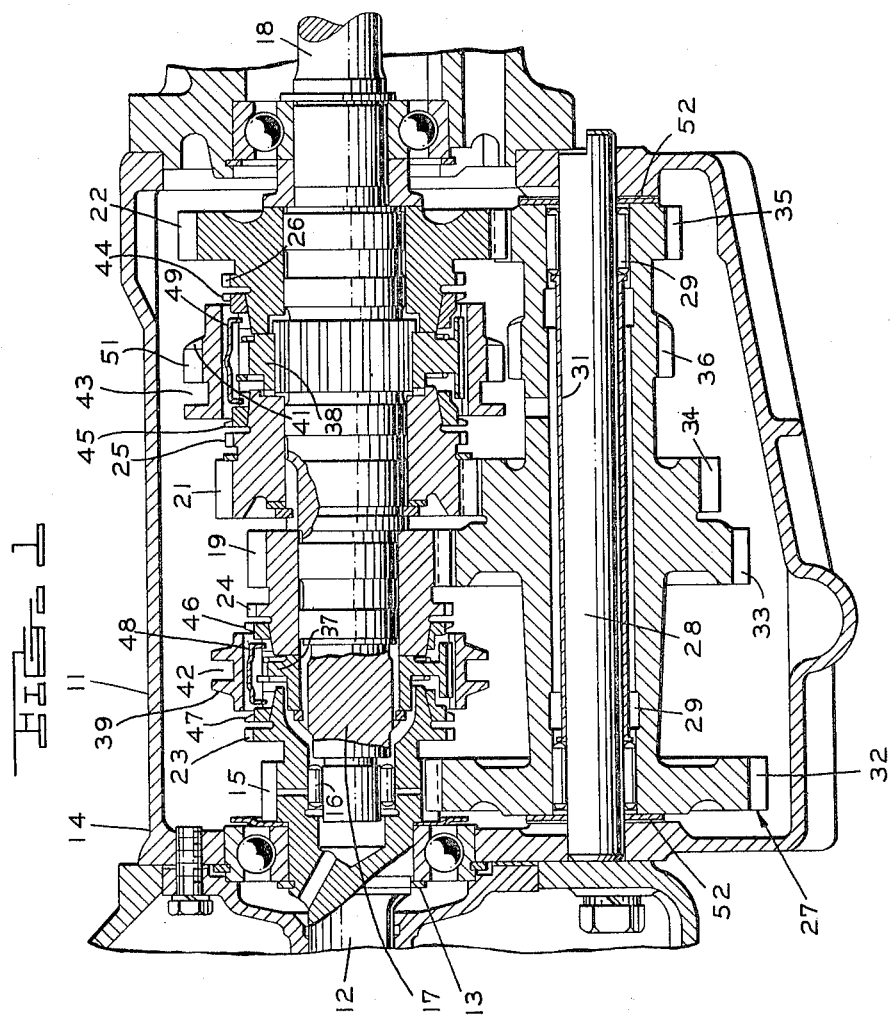

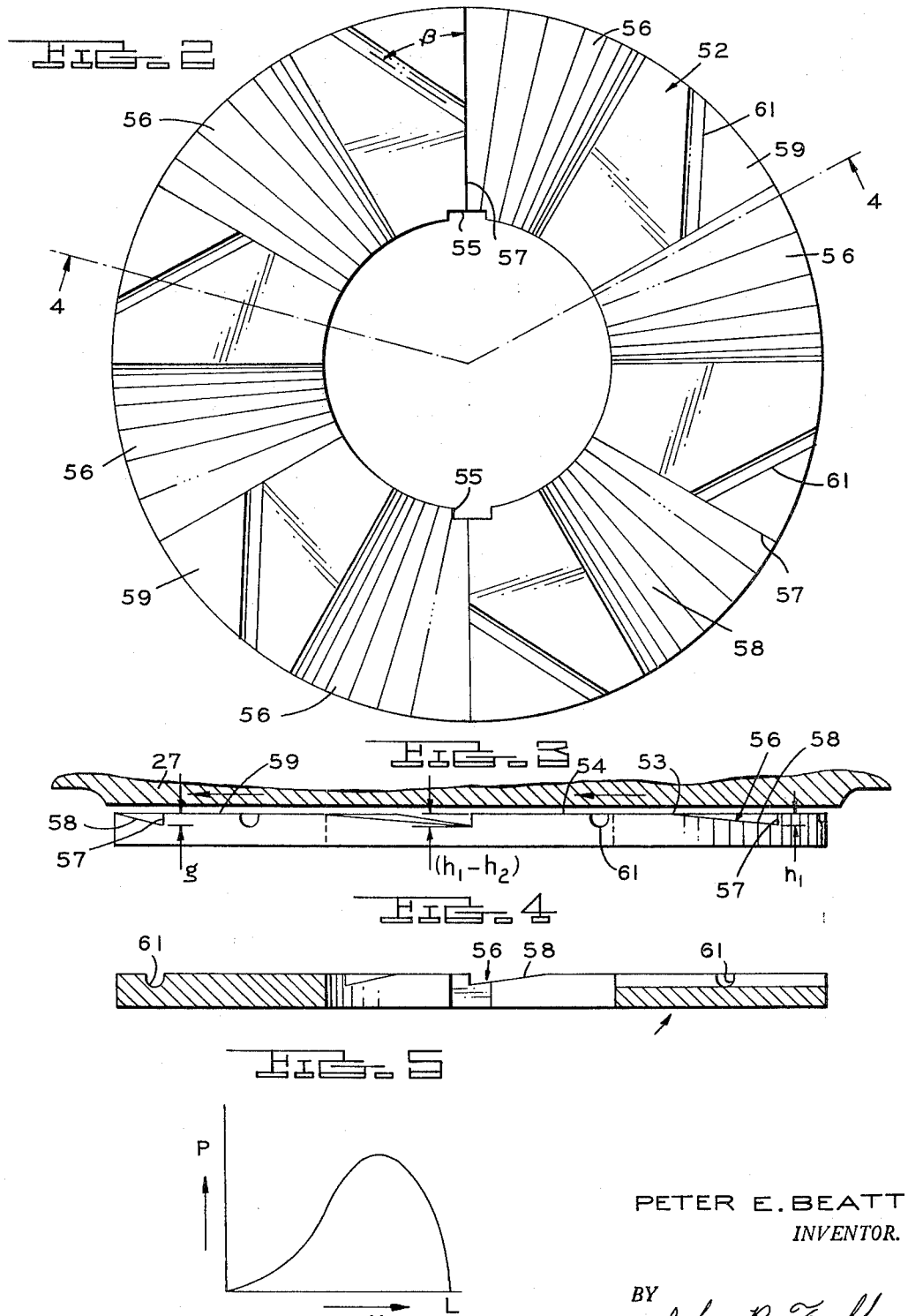

3,293,931
THRUST BEARINGS
Peter E. Beattie, Hornchurch, Essex, England, assignor to Ford Motor Company, Dearborn, Mich., a corporation of Delaware
Filed May 22, 1964, Ser. No. 369,373
4 Claims. (Cl. 74—325)

This invention relates generally to thrust bearings and more particularly to a thrust washer incorporated in a power transfer mechanism to absorb axial thrust developed during rotation of the gears within the mechanism.

The improvement of this invention can be readily adapted for use with conventional synchronized manual transmissions in which a power input shaft and a power output shaft are positioned on a common axis. A cluster gear assembly is disposed about the axis of a countershaft located in a spaced parallel relationship with respect to the power input and output shafts. Gears are rotatably mounted upon the output shaft and are in continuous meshing engagement with other gears of the cluster gear assembly. Although the axial thrusts developed by the gears during meshing engagement act in opposite directions, it is not always possible to achieve cancellation of the thrust in all speed ratios of the transmission mechanism. As a result, the axial thrust must be absorbed at least for some speed ratios by thrust bearings positioned on the countershaft at each end of the countershaft gear cluster assembly.

Bearings utilized in power transfer mechanisms to absorb the thrust are usually thrust washers having a flat surface which bears against the face of a rotatable member. These bearing surfaces are usually separated by an oil film of a molecular thickness, i.e., of the order of $10^{-7}$ inches during relative rotation thereof. Such lubrication by an oil film of this order of thickness is commonly referred to as "boundary lubrication." The effectiveness of such lubrication to prevent seizure of the rotatable members is determined by the oiliness of the lubricant. When boundary lubrication is employed, the load capacity of the thrust washer per unit area of the washer is severely limited and, moreover, deteriorates with increasing angular speed as a result of heat generated.

It has been found that, if one of the flat bearing surfaces is formed with recessed wedge-shaped portions which have surfaces that are upwardly inclined in the direction of rotation of the other bearing surface, a very high pressure is generated in the oil film between the bearing surfaces. This is due to the viscous shear of the oil film lubricant effected by the inclination of the surfaces of one of the bearing surfaces. This phenomena is usually referred to as "hydrodynamic lubrication."

When hydrodynamic lubrication is applied, the separation of the two opposite bearing surfaces is usually in the order of $10^{-4}$ inches, thereby reducing the probability of seizure of the two relatively rotatable members. With hydrodynamic lubrication, the load capacity of bearings increases with the cube of the mean diameter of the bearing surface and linearly with the angular speed of the rotatable member which in this instance is the countershaft gear cluster.

The principle of hydrodynamic lubrication has been applied to the design of bearings in the past. Kingsbury and Michell developed tilting pad thrust bearings that include a number of pivoted segments that are free to tilt both radially and tangentially. Such pivoted segments riding over a film of oil are wedge shaped due to the angle of tilt. These types of conventional thrust bearings are very expensive to manufacture and therefore have been applied only to costly power transmission devices such as used in ship propulsion systems.

Accordingly, one of the objects of this invention is to provide a power transfer mechanism comprising two relatively rotatable members having opposed bearing surfaces between which an axial thrust is developed and wherein the bearing surface of one of the members has recessed portions with surfaces inclined with respect to the other bearing surface to define wedge-shaped spaces therebetween. When an oil film is introduced between the bearing surfaces, a high pressure is generated in the oil film as a result of the viscous shear of the oil film during relative rotation of the members.

The bearing surfaces having recessed portions may be part of a separate thrust washer. The recessed portions are only effective to provide proper lubrication during relative rotation between the two members. In order to provide lubrication for the bearing surfaces at starting or low operating speeds by boundary lubrication techniques, other portions of the thrust washer may be provided with a land or lands on their bearing surface.

Another object of this invention is to provide adequate lubrication between bearing surfaces of a gear transmission mechanism for all speed ratios.

A further object of this invention is to provide a thrust washer which, when in an opposed relationship to a flat bearing surface of a rotatable member and with an oil film disposed between opposed bearing surfaces, will provide lubrication therebetween at low and at high operating speeds.

A still further object of this invention is to provide a low-cost thrust washer that can be manufactured by mass production methods.

Further objects and features of this invention will become more apparent from the following description when taken in conjunction with the accompanying drawings wherein:

FIGURE 1 is a cross sectional assembly view of a four-speed transmission mechanism embodying a thrust washer of this invention;

FIGURE 2 is a plan view of the thrust washer;

FIGURE 3 is a side elevational view of the thrust washer of FIGURE 2;

FIGURE 4 is a sectional view of the thrust washer taken along line 4—4 of FIGURE 2, and FIGURE 5 is a graph showing the pressure distribution along the inclined surfaces of the thrust washer of this invention.

In FIGURE 1 is seen a conventional, synchronized four-speed transmission mechanism generally designated as 11. The transmission mechanism 11 has a power input shaft 12 journaled in a suitable bearing 13 and received within a cooperating bearing opening provided in the housing 14 of the transmission mechanism 11. A power input gear 15 is formed integrally on the shaft 12 and is recessed to receive pilot bearings 16 journaling a portion of an intermediate shaft 17. This shaft 17 forms an extension of a power output shaft 18. Three spaced helical gears 19, 21 and 22 journal rotatably and are held axially fast on the shaft 17. The power input shaft 12 has formed thereon a clutch element having external clutch teeth 23. Helical gears 19, 21 and 22 also are formed with external clutch teeth 24, 25 and 26, respectively, to permit synchronization of these gears prior to their engagement.

A cluster gear assembly, generally designated as 27, is journaled for rotation about a countershaft 28 that has its end portions supported in the housing 14. Bearings 29 are provided for journaling the cluster gear assembly 27. A suitable spacer 31 is located between the spaced bearings 29. The cluster gear assembly 27 includes helical gears 32, 33, 34 and 35 and spur gear 36.

Gear 32 is in constant mesh with gear 15 mounted on the input shaft 12, and gears 33, 34 and 35 are in constant mesh with gears 19, 21 and 22 mounted on the intermediate shaft 17.

Spaced hubs 37 and 38 having splined inner and outer surfaces are retained on the intermediate shaft 17. The inner portion of each hub is mounted on a corresponding splined portion of the intermediate shaft 17. The outer splined portions of hubs 37 and 38 engage the splined inner surfaces of slidable clutch sleeves 39 and 41, respectively. These sleeves 39 and 41 are axially movable by shifter forks (not shown) received in cooperating external grooves 42 and 43.

A synchronizer clutch mechanism is provided to synchronize the motion of the gears prior to engagement of the clutching teeth to establish a locking connection between these gears and the power output shaft. The synchronizer clutch mechanism is conventional and comprises synchronizer rings 44, 45, 46 and 47 carried on conical surfaces of the input shaft 12 and the helical gears 19, 21 and 22, respectively, and fingers 48 and 49 formed integrally with the sleeves 39 and 41.

To obtain low-speed operation, the sleeve 41 is moved to the right by a shifter fork (not shown) to cause the inner surfaces of the sleeve 41 to engage the clutch teeth 26 following synchronization of the gear 22 with intermediate shaft 17 by the finger 49 and synchronizer ring 44.

To establish the second gear or low intermediate speed operation, the sleeve 41 is shifted to the left. This will result in the engagement of the inner surface of the sleeve 41 with clutch teeth 25 following synchronization by finger 48 and the synchronizer ring 45. Third gear or intermediate speed operation is effected by the engagement of the sleeve 39 and the clutch teeth 24 following synchronization by the fingers 48 and the synchronizer ring 46. To condition the transmission 11 for direct drive or high speed operation, sleeve 39 is shifted to the left so that its inner surfaces engage clutch teeth 23 following synchronization by the fingers 48 and the synchronizer ring 47. With the sleeves 39 and 41 in the positions illustrated in FIGURE 1, reverse gear of the vehicle may be engaged by moving an idler gear (not shown) into meshing engagement with the spur gear 36 of the countershaft cluster gear assembly 27 and a spur gear 51 integrally formed with the sleeve 41.

The countershaft 28 carries a pair of thrust washers 52, with each thrust washer having one face 53 in an opposed relationship to a flat bearing surface 54 on each end face of the cluster gear assembly 27. The thrust washers 52 are provided with slots 55 as best seen in FIGURE 2 so as to engage lugs (not shown) in the end walls of the housing 14 to prevent rotation of the thrust washers 52.

As best seen in FIGURES 2, 3 and 4, the face 53 of the thrust washer 52 is divided into an even number of sectors. Every other sector 56 is recessed from the face 53 of the thrust washer 52. The recessed sectors 56 are defined by a perpendicular surface 57 extending in a direction normal to the face 53 to a depth ($g$) and an inclined surface 58 extending upwardly from the foot of the surface 57 at a fixed angle in the direction of rotation of the gear cluster mechanism 27 as shown by the arrows in FIGURE 3. Each recessed sector 56, when in an opposed relationship to the bearing surface 54, defines a wedge-shaped space.

Other sectors 59 lying intermediate the recessed sectors 56 have flat land areas in a parallel relationship to the bearing surface 54 of the cluster gear assembly 27. Recessed oil supply grooves 61 are cut into the sectors 59 to place the outer periphery of the thrust washers 52 in communication with the surface 57 of the recessed sectors 56. The oil supply grooves 61 are inclined inwardly to make an angle $\beta$ with the surface 57 as best seen in FIGURE 2.

It can be shown that a film of lubricant introduced between the faces 53 of the thrust washers 52 and the adjacent thrust bearing surfaces 54 of the gear cluster assembly 27 will reduce the load capacity of the thrust washers 52. This can be expressed by an equation of the form of:

$$P = P_o L + C p \cdot \frac{6\mu U L^2}{h_2^2}$$

where P is the load capacity per unit radial width of the washer; $P_o$ is the pressure at which lubricant is initially fed to the washer; L is the total length of the inclined surface portions measured at the mean diameter of the washer; $\mu$ is the viscosity of the lubricant under operating conditions; U is the linear speed of the thrust face of the gear cluster, relatively to the washer, at the mean diameter of the washer; $h_2$ is the minimum lubricant film thickness, i.e., the thickness at the top of the inclined surface portions, and $C_p$, referred to as the "load factor," is equal to $$\frac{1}{(s-1)^2}\left[\log_e S - 2\left(\frac{s-1}{s+1}\right)\right]$$

where $$S = \frac{h_1}{h_2}, h_1$$

the maximum film thickness, i.e., the thickness at the foot of the inclined surface portions.

In a transmission of the type illustrated, the factor $P_o$ has a small value and, therefore, the entire first term of $P_oL$ can be neglected. Since the linear speed U may be expressed as $\pi DN$ feet per minute, the load capacity increases linearly with the diameter of the thrust washer 52. Since $$L\left(\frac{\pi D}{n}\right)$$

increases linearly with the diameter, the load capacity also increases with the cube of the mean diameter of the thrust washer 52.

Unlike conventional thrust washers operating under boundary lubrication conditions only, the load capacity of the thrust washer 52 of this invention hereinafter referred to as a "hydrodynamic thrust washer" increases linearly with the angular speed of the thrust surface 54 of the gear cluster assembly 27.

Since the power input gear 15 on the input shaft 12 is in constant mesh with the helical gear 32 of the gear cluster assembly 27 during rotation of the input shaft 12, oppositely directed axial thrusts are exerted on the input shaft 12 and the gear cluster assembly 27. The thrust on the input shaft 12 is taken up by bearing 13, but the axial thrust on the gear cluster assembly 27 can only be taken up by either one or the other of the two hydrodynamic thrust washers 52 depending on the relative positions of the contacting surfaces of the meshing gears 15 and 32.

The helical gears which establish the forward power flow path, i.e., first, second and third gears, are arranged so that, when one of the gears is selected, opposing axial thrusts are exerted on the countershaft gear cluster assembly 27. Although for a particular speed ratio it is possible that the thrust on the cluster gear assembly 27 is balanced, thrust cancellation, in general, for all speed ratios is usually not effected. For reverse operation, no opposing axial thrust is exerted as the gears employed are simple spur gears.

The thrust effect on the gear cluster assembly 27 varies the values of $h_1$ and $h_2$; namely, the thickness of the lubricant film at the base and top of the inclined surfaces 58 of the hydrodynamic thrust washers 52. As $h_1$ and $h_2$ decreases, the pressure generated in the lubricant oil film increases. The pressure distribution along the entire inclined surface 58 is presented in the graph shown in FIGURE 5. This graph clearly shows that the lubricant pressure reaches a maximum value at a point somewhere between the high and low point of the inclined surface 58. The effect of a decreasing value of $h_1$ and $h_2$ is an increase in the ordinate values of the curve. The minimum film thickness of $h_2$ is affected by the surface finish of the opposed bearing surfaces or by any foreign bodies carried in the lubricant. In actual practice, $h_2$ has a value between $10^{-4}$ to $10^{-3}$ inches.

It can be shown that for any given distribution along the inclined surface 58, the maximum load capacity of the thrust washer 52 will occur when it is equal to 2.2 pounds. Assuming that the minimum film thickness of $h$ is equal to $10^{-3}$ inches at optimum load capacity, the theoretical optimum depth $(h_1-h_2)$ is equal to .0012 inch. Although, in practice, the gear cluster assembly 27 and the countershaft 28 may bend as a result of the gear separating forces, the face 53 of the thrust washer may not be maintained in the exact parallel relationship with the bearing surfaces 54 of the cluster gear assembly 27. To compensate for such bending, the depth $(h_1-h_2)$ of the recessed sectors 56 is increased to the next higher order of magnitude, i.e., to $10^{-2}$ inches. When parallelism of the thrust bearing surfaces can be assured, as, for example, when the shaft is subjected to pure axial thrust only, the depth $(h_1-h_2)$ is preferably at or near the optimum value.

In order to ensure an adequate supply of lubricant to the base of the recessed sectors 56, the angle $\beta$ is chosen so that the component of the viscous shear force along the groove 61 is sufficient to cause the inward movement of the oil against centrifugal forces effected by the angular movement of the cluster gear assembly 27.

A direct linear relationship exists between the load capacity of the thrust washer 52 and the oil viscosity. If the oil viscosity is too high, an inadequate supply of lubricant to the inclined surfaces 58 may result despite the provision for oil supply grooves 61.

To provide an adequate bearing surface area between the end face 53 of the thrust washer 52 and opposed bearing surfaces 54 at low speeds of rotation or when starting from rest, sectors 59 may have flat land areas that occupy 50 percent of the entire bearing surface of the thrust washer 52. This area allocated for lands may be varied depending on the application in which the thrust washers 52 are to be employed. In continuously running machinery, it is possible to dispense with flat land areas completely or reduce the area of the lands to a smaller proportion than the 50 percent illustrated. The flat land areas do not have to be confined to alternating sectors as shown in FIGURE 2 but may be in the form of an annular ring that encompasses the recessed sectors 56 or may be integrally or separately formed with the remaining portion of the thrust washer 52.

It will be further understood that this invention is not to be limited to the exact construction shown and described but that various changes and modifications may be made without departing from the spirit and scope of the invention as defined in the appended claims.

I claim:

1. In a transmission, at least two relatively rotatable members between which an axial thrust is developed during rotation of one member relative to another, each member having a planar bearing surface normal to the axis of rotation, said planar bearing surfaces being in opposed relationship to each other with a thin oil film disposed therebetween during relative rotation of said members, one of said planar bearing surfaces having recessed portions, said recessed portions having surfaces inclined upwardly towards the planar bearing surface in opposed relationship therewith to define wedge-shaped spaces therebetween, said wedge-shaped spaces pointing in the direction of rotation of said one member so as to generate a high pressure in said oil film between the bearing surfaces during relative rotation between said members as a result of viscous shear of the oil film, oil supply grooves formed in said one bearing surface intermediate its recessed portions, each oil supply groove extending radially inwardly and communicating with the base of its adjacent recessed portion, each groove forming an acute angle with respect to a radial reference line whereby oil is supplied through said grooves in a radially inward direction to said recessed portions against the opposing influence of centrifugal force due to relative rotation of said relatively rotatable members.

2. In a transmission, a shaft, a rotatable gear cluster mounted on said shaft, a thrust washer mounted on said shaft and held against rotation, said thrust washer having a planar bearing surface, said gear cluster having a planar bearing surface on one of its end faces, said planar bearing surface of said gear cluster being in an opposed relationship to said planar bearing surface of said thrust washer between which an axial thrust is developed during rotation of said gear cluster, an oil film disposed between said bearing surfaces, the bearing surface of said thrust washer being divided into sectors, alternating sectors thereof being recessed and defined by a first surface extending inwardly from said bearing surface and a second surface inclined upwardly from the foot of said first surface towards the bearing surface of said gear cluster, the remaining sectors having land portions parallel to the bearing surface of said gear cluster, said second inclined surfaces of the recessed alternating sectors pointing in the direction of rotation of said gear cluster so as to generate a high pressure in the oil film between said bearing surfaces when said gear cluster is being rotated as a result of viscous shear of the oil film, oil supply grooves formed in the bearing surface of said thrust member intermediate said sectors, said grooves forming an acute angle with respect to a radial reference line and extending radially inwardly, the radially inward end of each groove communicating with said foot of said first surface whereby oil is supplied to said sectors in a radially inward direction against the opposing influence of centrifugal force due to rotation of said gear cluster.

3. The transmission as described in claim 2 and which is further characterized in that said oil grooves are cut into the thrust member bearing surface to place the periphery of said thrust washer in communication with the first surface of said alternating sectors.

4. In a transmission, a shaft, a rotatable gear cluster mounted on said shaft, a pair of thrust washers, said thrust washers mounted on said shaft and held against rotation, each thrust washer having a planar bearing surface, said gear cluster having a planar bearing surface on each of its end faces, each planar bearing surface of said gear cluster being in opposed relationship to the planar bearing surface of one of said pair of thrust washers to absorb any axial thrust that is developed between the bearing surfaces of said gear cluster and said thrust washers during rotation of said gear cluster, an oil film disposed between opposed bearing surfaces, said bearing surfaces of the thrust washers having recessed portions, said recessed portions having surfaces inclined upwardly with respect to the bearing surface of said gear cluster to define wedge-shaped spaces between each of said opposed bearing surfaces, said wedge-shaped spaces pointing in the direction of rotation of said gear cluster so as to generate a high pressure in the oil film between corresponding bearing surfaces when said gear cluster is being rotated as a result of viscous shear of the oil film, oil supply grooves formed in the planar bearing surface of said one of said pair of thrust washers, each groove extending radially inwardly and communicating with the base of its adjacent recessed bearing surface portion, each supply groove forming an acute angle with respect to a radial reference line whereby oil is supplied in a radially inward direction through said grooves to said inclined surfaces against the opposing influences of centrifugal force due to rotation of said gear cluster.

References Cited by the Examiner

UNITED STATES PATENTS

| | | | |
|---|---|---|---|
| 1,459,454 | 6/1923 | Trotter | 308—160 |
| 1,682,189 | 8/1928 | Schein | 308—160 |
| 2,543,385 | 2/1951 | Tarlton | 74—333 |
| 2,899,243 | 8/1959 | Acterman | 308—9 |
| 3,115,048 | 12/1963 | Cape | 74—333 |

FOREIGN PATENTS

| | | |
|---|---|---|
| 74,991 | 7/1917 | Austria. |
| 201,459 | 8/1923 | Great Britain. |

MARTIN P. SCHWADRON, *Primary Examiner.*

FRANK SUSKO, *Examiner.*